United States Patent
Sakai et al.

(10) Patent No.: US 11,885,741 B2
(45) Date of Patent: Jan. 30, 2024

(54) ANALYSIS DEVICE, LIQUEFIED GAS PRODUCTION PLANT, AND PROPERTY ANALYSIS METHOD

(71) Applicant: YOKOGAWA ELECTRIC CORPORATION, Tokyo (JP)

(72) Inventors: Ryota Sakai, Musashino (JP); Hideko Tanaka, Musashino (JP); Youko Nozawa, Musashino (JP); Toshiki Ohara, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 0 days.

(21) Appl. No.: 17/727,385

(22) Filed: Apr. 22, 2022

(65) Prior Publication Data
US 2022/0244175 A1 Aug. 4, 2022

Related U.S. Application Data

(62) Division of application No. 16/720,426, filed on Dec. 19, 2019, now Pat. No. 11,340,159.

(30) Foreign Application Priority Data

Dec. 28, 2018 (JP) .................................. 2018-247804

(51) Int. Cl.
*G01N 21/359* (2014.01)
*G01N 21/27* (2006.01)
*G01N 21/3504* (2014.01)

(52) U.S. Cl.
CPC ......... *G01N 21/359* (2013.01); *G01N 21/274* (2013.01); *G01N 21/3504* (2013.01); *G01N 2201/0231* (2013.01)

(58) Field of Classification Search
CPC .............. G01N 21/359; G01N 21/274; G01N 21/3504; G01N 2201/0231; G01N 21/3577; G01N 2201/129
See application file for complete search history.

(56) References Cited

U.S. PATENT DOCUMENTS

| | | | |
|---|---|---|---|
| 2002/0152797 A1* | 10/2002 | McAndrew | ............ G01N 21/39 73/23.2 |
| 2006/0144126 A1 | 7/2006 | O'Brien et al. | |
| 2010/0228688 A1 | 9/2010 | Little et al. | |

FOREIGN PATENT DOCUMENTS

| | | | | |
|---|---|---|---|---|
| CN | 102971594 A | | 3/2013 | |
| CN | 111065913 A | * | 4/2020 | ............... G01N 1/24 |

(Continued)

OTHER PUBLICATIONS

A.J. Rest et al., "Near-Infrared Study of the Light Liquid Alkanes", Applied Spectroscopy, vol. 50, No. 4, 1996, pp.517-520; Cited in Extended European Search Report dated May 12, 2020.

*Primary Examiner* — Christine S. Kim
(74) *Attorney, Agent, or Firm* — RANKIN, HILL & CLARK LLP

(57) ABSTRACT

A measurement device includes: a container into which sample gas is to be injected; a liquefaction mechanism configured to liquefy the sample gas in the container; a near-infrared probe extending from inside to outside the container; and a near-infrared measuring instrument configured to measure an absorbance spectrum of the sample gas in a state of being liquefied by the liquefaction mechanism, via the near-infrared probe.

3 Claims, 9 Drawing Sheets

(56) References Cited

FOREIGN PATENT DOCUMENTS

| | | |
|---|---|---|
| GB | 2426579 | 11/2006 |
| JP | 6-347398 A | 12/1994 |
| JP | 08-248021 | 9/1996 |
| JP | 2000-356590 A | 12/2000 |
| JP | 2002-533714 A | 10/2002 |
| JP | 2006-23200 A | 1/2006 |
| JP | 2008-14878 A | 1/2008 |
| WO | 00/39561 | 7/2000 |
| WO | 00/39561 A1 | 7/2000 |

\* cited by examiner

ANALYSIS DEVICE, LIQUEFIED GAS PRODUCTION PLANT, AND PROPERTY ANALYSIS METHOD

CROSS-REFERENCE TO RELATED APPLICATION

This application claims priority to and the benefit of Japanese Patent Application No. 2018-247804 filed on Dec. 28, 2018, the entire disclosure of which is incorporated herein by reference.

TECHNICAL FIELD

The present disclosure relates to a measurement device, a calibration curve generation system, a spectrum measurement method, a calibration curve generation method, an analysis device, a liquefied gas production plant, and a property analysis method.

BACKGROUND

PTL 1 describes a technique of analyzing components of LNG using a gas chromatograph in an LNG production process. The "LNG" stands for liquefied natural gas.

CITATION LIST

Patent Literature

PTL 1: JP H08-248021 A

SUMMARY

A measurement device according to some embodiments includes: a container into which sample gas is to be injected; a liquefaction mechanism configured to liquefy the sample gas in the container; a near-infrared probe extending from inside to outside the container; and a near-infrared measuring instrument configured to measure an absorbance spectrum of the sample gas in a state of being liquefied by the liquefaction mechanism, via the near-infrared probe.

A spectrum measurement method according to some embodiments is a spectrum measurement method used by a measurement device including a container into which sample gas is injectable, the spectrum measurement method including: liquefying the sample gas injected in the container; and measuring an absorbance spectrum of the sample gas in a liquefied state by a near-infrared measuring instrument, via a near-infrared probe extending from inside to outside the container.

An analysis device according to some embodiments includes: a memory configured to store a calibration curve representing a relationship between a property value and an absorbance spectrum of sample gas, the calibration curve being generated from a measurement result of the absorbance spectrum of the sample gas obtained for each property value as a result of injecting the sample gas into a container, liquefying the sample gas in the container, measuring the absorbance spectrum of the sample gas in a liquefied state by a near-infrared measuring instrument via a near-infrared probe extending from inside to outside the container, and using a plurality of samples that differ in property value as the sample gas; a meter configured to measure an absorbance spectrum of liquefied gas using near-infrared spectroscopy; and a controller configured to calculate a property value of the liquefied gas, from the calibration curve stored in the memory and a measurement result of the absorbance spectrum of the liquefied gas obtained by the meter.

A property analysis method according to some embodiments is a property analysis method used by an analysis device, the property analysis method including: measuring an absorbance spectrum of liquefied gas using near-infrared spectroscopy; and calculating a property value of the liquefied gas from a calibration curve representing a relationship between a property value and an absorbance spectrum of sample gas and a measurement result of the absorbance spectrum of the liquefied gas, the calibration curve being generated from a measurement result of the absorbance spectrum of the sample gas obtained for each property value as a result of injecting the sample gas into a container, liquefying the sample gas in the container, measuring the absorbance spectrum of the sample gas in a liquefied state by a near-infrared measuring instrument via a near-infrared probe extending from inside to outside the container, and using a plurality of samples that differ in property value as the sample gas.

DETAILED DESCRIPTION

Figure 1:
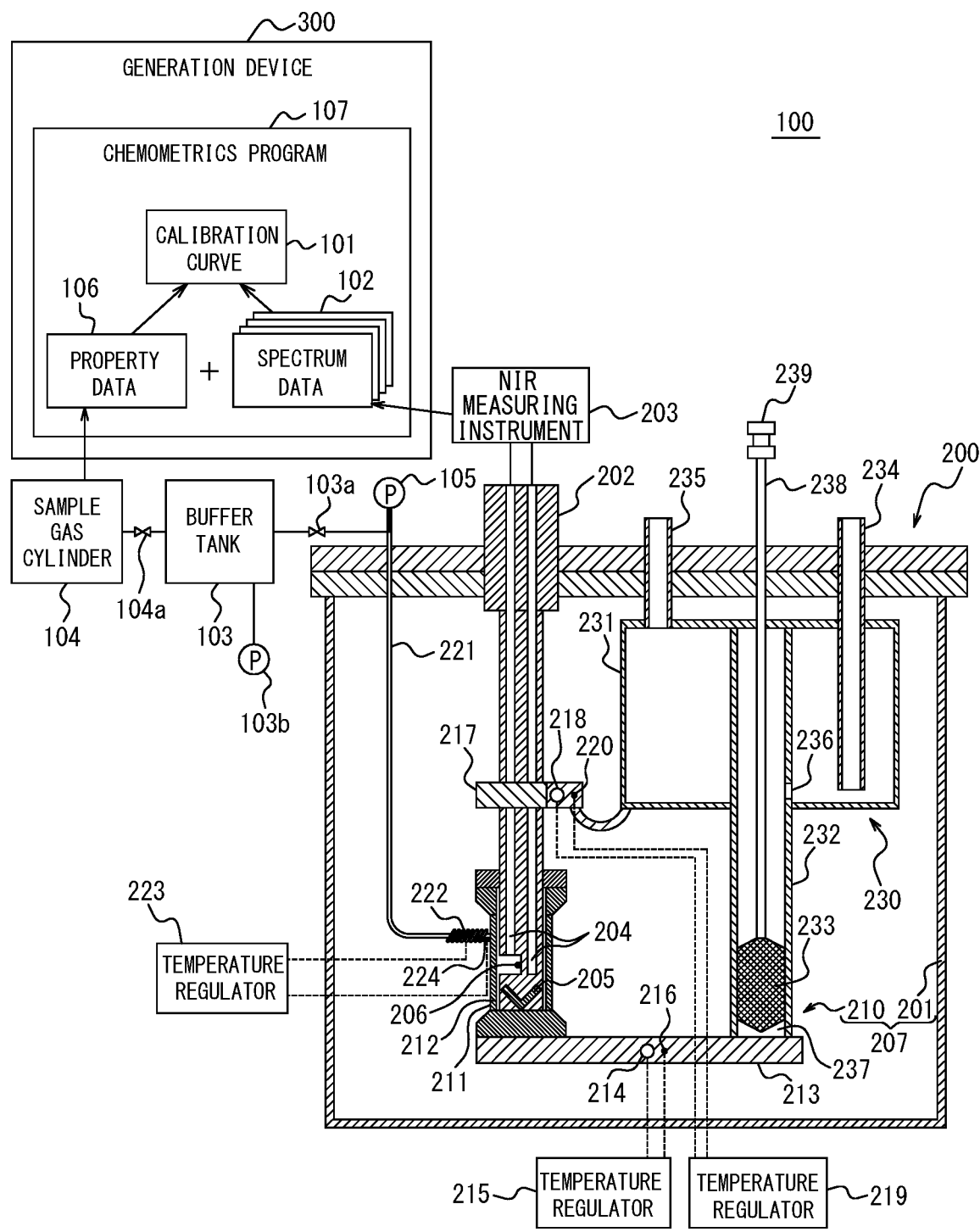
FIG. 1 is a diagram illustrating a structure of a calibration curve generation system according to one of the disclosed embodiments.

To analyze components of LNG using a gas chromatograph, the LNG needs to be vaporized. Thus, it takes time to vaporize the LNG for analysis.

In view of this, a near-infrared spectrometer may be used to, without vaporizing liquefied gas such as LNG, analyze properties of liquefied gas such as the concentration of each component. Near-infrared light which is light of 0.7 µm to 2.5 µm in wavelength resonates with vibration and rotation of molecules and is absorbed. Wavelength subjected to absorption differs depending on the chemical structure of a molecule, and accordingly information about the chemical structure of a substance can be obtained from an absorbance spectrum. A near-infrared spectrometer irradiates a sample with near-infrared light. The sample absorbs light of specific wavelength, as a result of which an absorbance spectrum is obtained. The composition can be determined from the absorbance spectrum using a calibration curve. Since the sample is merely irradiated with near-infrared light, high-speed analysis is possible without destroying the sample. The calibration curve is a formula representing the relationship between the property value and the absorbance spectrum of the liquefied gas, or data indicating the formula.

However, to analyze the property of the liquefied gas using the near-infrared spectrometer, the calibration curve needs to be generated beforehand. The generation of the calibration curve in an actual process requires collecting a sufficient amount of spectrum data over a long period of time until the property value of the liquefied gas varies so as to cover a desired range. Thus, it takes time to enable the analysis.

An object of the present disclosure is to improve the efficiency of liquefied gas property analysis.

A measurement device according to some embodiments includes: a container into which sample gas is to be injected; a liquefaction mechanism configured to liquefy the sample gas in the container; a near-infrared probe extending from inside to outside the container; and a near-infrared measuring instrument configured to measure an absorbance spectrum of the sample gas in a state of being liquefied by the liquefaction mechanism, via the near-infrared probe. With such a measurement device, spectrum data can be collected without installing a near-infrared measuring instrument in an actual process. By using, as the sample gas, a plurality of samples each adjusted so that the property value covers a desired range, a sufficient amount of spectrum data can be collected in a short time. Moreover, the range of the property value can be freely widened. From the collected spectrum data, a calibration curve representing the relationship between the property value and the absorbance spectrum of liquefied gas can be generated. Thus, by use of the measurement device including the near-infrared measuring instrument, the property of the liquefied gas can be analyzed without vaporizing the liquefied gas. This improves the efficiency of liquefied gas property analysis.

In one embodiment, the liquefaction mechanism may include: a cylindrical body configured to form a liquefaction chamber into which the sample gas is to be introduced, in the container; and a cooling instrument configured to cool the cylindrical body to liquefy the sample gas in the liquefaction chamber, part of the near-infrared probe may be located in the liquefaction chamber, and the near-infrared measuring instrument may be configured to irradiate the sample gas in the liquefaction chamber in a state of being liquefied by the cooling instrument with near-infrared light via the near-infrared probe, and detect at least one of transmitted light or reflected light via the near-infrared probe to measure the absorbance spectrum of the sample gas. According to this embodiment, the sample gas is liquefied in the liquefaction chamber, and the sample gas in a liquefied state is irradiated with near-infrared light for measurement in the same liquefaction chamber. In this way, the absorbance spectrum of the sample gas in a liquefied state can be measured with high accuracy.

In one embodiment, the liquefaction mechanism may further include: a heat transfer material configured to thermally connect the cooling instrument to the cylindrical body; a heater configured to heat the heat transfer material; and a temperature regulator configured to regulate a temperature of the heat transfer material by controlling the heater. According to this embodiment, both cooling and heating are possible, so that the temperature in the liquefaction chamber can be freely regulated.

In one embodiment, the cooling instrument may include: a coolant tank into which a coolant is to be injected; and a cooling pipe configured to convey the coolant from the coolant tank to the heat transfer material. According to this embodiment, the temperature in the liquefaction chamber can be decreased with a simple structure.

In one embodiment, the liquefaction mechanism may further include: a heat transfer material configured to thermally connect the cooling instrument to the near-infrared probe; a heater configured to heat the heat transfer material; and a temperature regulator configured to regulate a temperature of the heat transfer material by controlling the heater. According to this embodiment, both cooling and heating are possible, so that the temperature in the liquefaction chamber can be freely regulated.

In one embodiment, the cooling instrument may include a coolant tank into which a coolant is to be injected, and the heat transfer material may be configured to thermally connect an outer shell of the coolant tank to the near-infrared probe. According to this embodiment, the temperature in the liquefaction chamber can be decreased with a simple structure.

In one embodiment, the liquefaction mechanism may further include an introduction tube having an inner diameter of 1 mm or less and configured to introduce the sample gas into the liquefaction chamber. According to this embodiment, the introduction tube is narrow, which prevents backflow of the sample gas.

In one embodiment, the measurement device may further include a temperature sensor located in the liquefaction chamber and configured to measure a temperature of the sample gas. According to this embodiment, the temperature of the sample gas in a liquefied state can be measured with high accuracy.

A calibration curve generation system according to some embodiments includes: the above-described measurement device; and a generation device configured to generate, from a measurement result of the absorbance spectrum of the sample gas obtained by the measurement device for each property value as a result of using a plurality of samples that differ in property value as the sample gas, a calibration curve representing a relationship between the property value and the absorbance spectrum of the sample gas. With such a calibration curve generation system, by using, as the sample gas, a plurality of samples each adjusted so that the property value covers a desired range, a highly versatile calibration curve, namely, a universal calibration curve, can be generated in a short time. Moreover, the range of the property value can be freely widened. When analyzing the property of liquefied gas using an analysis device including a near-infrared measuring instrument, the property value of the liquefied gas can be obtained by applying the measurement result of the absorbance spectrum of the liquefied gas obtained by the near-infrared measuring instrument to the generated calibration curve. This improves the efficiency of liquefied gas property analysis.

In one embodiment, the generation device may be configured to generate, from a measurement result of the absorbance spectrum of the sample gas obtained by the measurement device for each combination of a property value and the temperature as a result of using a plurality of samples that differ in property value as the sample gas and changing the temperature of the sample gas in the liquefaction chamber, a calibration curve representing a relationship among the property value, the temperature, and the absorbance spectrum of the sample gas. According to this embodiment, an offset in the spectrum measurement result caused by a temperature difference can be corrected.

A spectrum measurement method according to some embodiments is a spectrum measurement method used by a measurement device including a container into which sample gas is injectable, the spectrum measurement method including: liquefying the sample gas injected in the container; and measuring an absorbance spectrum of the sample gas in a liquefied state by a near-infrared measuring instrument, via a near-infrared probe extending from inside to outside the container. With such a spectrum measurement method, spectrum data can be collected without installing a near-infrared measuring instrument in an actual process. By using, as the sample gas, a plurality of samples each adjusted so that the property value covers a desired range, a sufficient amount of spectrum data can be collected in a short time. Moreover, the range of the property value can be freely widened. From the collected spectrum data, a calibration curve representing the relationship between the property value and the absorbance spectrum of liquefied gas can be generated. Thus, by use of the measurement device including the near-infrared measuring instrument, the property of the liquefied gas can be analyzed without vaporizing the liquefied gas. This improves the efficiency of liquefied gas property analysis.

In one embodiment, the spectrum measurement method may include: filling a buffer tank with the sample gas after vacuuming the buffer tank; and injecting the sample gas from the buffer tank into the container. According to this embodiment, the purity of the sample gas can be maintained.

A calibration curve generation method according to some embodiments includes: measuring the absorbance spectrum of the sample gas using the above-described spectrum measurement method; and generating, from a measurement result of the absorbance spectrum of the sample gas obtained for each property value as a result of using a plurality of samples that differ in property value as the sample gas, a calibration curve representing a relationship between the property value and the absorbance spectrum of the sample gas. With such a calibration curve generation method, by using, as the sample gas, a plurality of samples each adjusted so that the property value covers a desired range, a highly versatile calibration curve, namely, a universal calibration curve, can be generated in a short time. Moreover, the range of the property value can be freely widened. When analyzing the property of liquefied gas using an analysis device including a near-infrared measuring instrument, the property value of the liquefied gas can be obtained by applying the measurement result of the absorbance spectrum of the liquefied gas obtained by the near-infrared measuring instrument to the generated calibration curve. This improves the efficiency of liquefied gas property analysis.

In one embodiment, the calibration curve generation method may include: measuring a temperature of the sample gas in the liquefied state; and generating, from a measurement result of the absorbance spectrum of the sample gas obtained for each combination of the property value and the temperature as a result of using a plurality of samples that differ in property value as the sample gas and changing the temperature of the sample gas in the liquefied state, a calibration curve representing a relationship among the property value, the temperature, and the absorbance spectrum of the sample gas. According to this embodiment, an offset in the spectrum measurement result caused by a temperature difference can be corrected.

An analysis device according to some embodiments includes: a memory configured to store a calibration curve representing a relationship between a property value and an absorbance spectrum of sample gas, the calibration curve being generated from a measurement result of the absorbance spectrum of the sample gas obtained for each property value as a result of injecting the sample gas into a container, liquefying the sample gas in the container, measuring the absorbance spectrum of the sample gas in a liquefied state by a near-infrared measuring instrument via a near-infrared probe extending from inside to outside the container, and using a plurality of samples that differ in property value as the sample gas; a meter configured to measure an absorbance spectrum of liquefied gas using near-infrared spectroscopy; and a controller configured to calculate a property value of the liquefied gas, from the calibration curve stored in the memory and a measurement result of the absorbance spectrum of the liquefied gas obtained by the meter. With such an analysis device, the property of the liquefied gas can be analyzed without vaporizing the liquefied gas. This improves the efficiency of liquefied gas property analysis.

In one embodiment, the analysis device may further include an input interface configured to receive input of a measurement result of a temperature of the liquefied gas, wherein the memory is configured to store, as the calibration curve, a calibration curve representing a relationship among the property value, a temperature, and the absorbance spectrum of the sample gas, the calibration curve being generated from a measurement result of the absorbance spectrum of the sample gas obtained for each combination of the property value and the temperature as a result of measuring the temperature of the sample gas in the liquefied state, using the plurality of samples that differ in property value as the sample gas, and changing the temperature of the sample gas in the liquefied state, and the controller is configured to calculate the property value of the liquefied gas, from the calibration curve stored in the memory, the measurement result of the temperature of the liquefied gas input in the input interface, and the measurement result of the absorbance spectrum of the liquefied gas obtained by the meter. According to this embodiment, an offset in the spectrum measurement result caused by a temperature difference can be corrected.

A liquefied gas production plant according to some embodiments includes the above-described analysis device. With such a liquefied gas production plant, the property of the liquefied gas can be analyzed without vaporizing the liquefied gas. This improves the efficiency of liquefied gas property analysis.

A property analysis method according to some embodiments is a property analysis method used by an analysis device, the property analysis method including: measuring an absorbance spectrum of liquefied gas using near-infrared spectroscopy; and calculating a property value of the liquefied gas from a calibration curve representing a relationship between a property value and an absorbance spectrum of sample gas and a measurement result of the absorbance spectrum of the liquefied gas, the calibration curve being generated from a measurement result of the absorbance spectrum of the sample gas obtained for each property value as a result of injecting the sample gas into a container, liquefying the sample gas in the container, measuring the absorbance spectrum of the sample gas in a liquefied state by a near-infrared measuring instrument via a near-infrared probe extending from inside to outside the container, and using a plurality of samples that differ in property value as the sample gas. With such a property analysis method, the property of the liquefied gas can be analyzed without vaporizing the liquefied gas. This improves the efficiency of liquefied gas property analysis.

In one embodiment, the property analysis method may include: measuring a temperature of the liquefied gas; and calculating the property value of the liquefied gas from, as the calibration curve, a calibration curve representing a relationship among the property value, a temperature, and the absorbance spectrum of the sample gas and the measurement result of the absorbance spectrum of the liquefied gas and a measurement result of the temperature of the liquefied gas, the calibration curve being generated from the measurement result of the absorbance spectrum of the sample gas obtained for each combination of the property value and the temperature as a result of measuring the temperature of the sample gas in the liquefied state, using the plurality of samples that differ in property value as the sample gas, and changing the temperature of the sample gas in the liquefied state. According to this embodiment, an offset in the spectrum measurement result caused by a temperature difference can be corrected.

According to the present disclosure, it is possible to improve the efficiency of liquefied gas property analysis.

A property value of LNG may be measured directly and continuously by using a near-infrared spectrometer, without vaporizing the LNG. This measurement can be performed by applying, to a calibration curve generated beforehand, spectrum data which is information of absorbance obtained from at least one of transmitted light or reflected light (i.e. transmitted light and/or reflected light) of the LNG to be measured.

Figure 9:
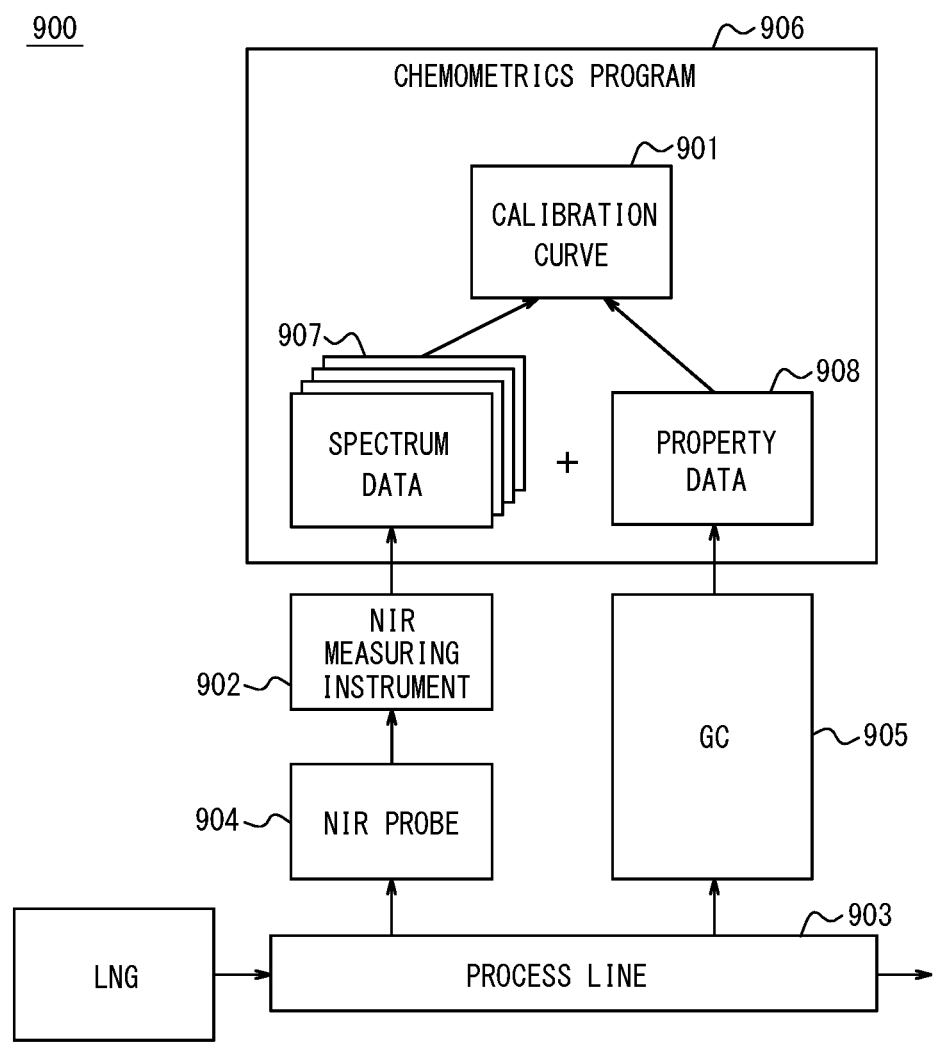
FIG. 9 is a diagram illustrating a structure of a calibration curve generation system according to the comparative example.

To clarify problems regarding the generation of a calibration curve, a comparative example will be described below with reference to FIG. 9, prior to the description of one of the disclosed embodiments.

In the drawing, "NIR" stands for near infrared.

In this comparative example, a calibration curve 901 is generated by introducing a near-infrared (NIR) measuring instrument 902 into a facility in which LNG is actually used. The LNG to be analyzed flows in a process line 903.

A calibration curve generation system 900 according to this comparative example includes a near-infrared (NIR) probe 904, the near-infrared measuring instrument 902, a gas chromatograph (GC) 905, and a computer installed with a chemometrics program 906.

The near-infrared probe 904 is inserted in piping of the process line 903. The near-infrared measuring instrument 902 is connected to the near-infrared probe 904. The near-infrared measuring instrument 902 measures the absorbance of near-infrared light by the LNG, and outputs spectrum data 907. The gas chromatograph 905 is an analyzer for analyzing a property value of the LNG corresponding to the spectrum data 907 output from the near-infrared measuring instrument 902. The gas chromatograph 905 vaporizes the LNG, analyzes the components of the LNG, and outputs property data 908.

The near-infrared measuring instrument 902 continuously detects the spectrum in a cycle of 60 seconds or less, and outputs the detection result as the spectrum data 907. The gas chromatograph 905 detects the components of the LNG in a cycle of about 5 minutes to 30 minutes, calculates the concentration of each measured component from the detection result and calculates the calorific value or density of the LNG from the concentration, and outputs the calculation result as the property data 908. The calibration curve generation system 900 calculates the correlation between the spectrum data 907 output from the near-infrared measuring instrument 902 and the property data 908 output from the gas chromatograph 905 using the chemometrics program 906, to generate the calibration curve 901. Once the generated calibration curve 901 is installed into a near-infrared spectrometer, the near-infrared spectrometer can be used to measure the property value of the LNG without vaporizing the LNG.

For the generation of the calibration curve 901, the number of pieces of spectrum data 907 needs to be sufficient to cover a range in which each factor that varies the spectrum, such as the concentration of each measured component and the temperature, can vary. For example, in the case where three factors each change in three ways, the number of pieces of spectrum data 907 necessary to generate the calibration curve 901 to measure these factors is 3×3×3=27. In the case of directly measuring the LNG flowing in the process line 903, examples of factors that vary the spectrum include the concentration of each component such as methane, ethane, propane, butane, isobutane, and nitrogen, the temperature, the pressure, and the density.

With a method of directly measuring the LNG flowing in the process line 903, it is necessary to introduce the near-infrared measuring instrument 902 into an actual process and collect data of about six months, in order to obtain data for generating the calibration curve 901. The composition of LNG differs depending on the producing country, and also varies depending on the manner of storage in the plant and the process. LNG does not form a liquid unless the temperature is low or unless the temperature is low and the pressure is higher than atmospheric pressure. Therefore, it is difficult to prepare LNG of any composition in such an amount that can be handled in a laboratory.

With the foregoing method, it takes much time and labor to enable the measurement of the property value, and only a calibration curve 901 of a limited range for each process can be generated. While the composition of LNG differs depending on the producing region, the concentration range of methane is approximately 80% to 100%. On the other hand, the concentration range of methane in a calibration curve 901 generated in a process was approximately 88% to 92%. This is because, given the composition of LNG as raw material and the operation in the actual process, the concentration only varied in such a range in six months. Since each property value outside the range of the generated calibration curve 901 cannot be measured, in the case where the concentration range to be measured changes, the calibration curve 901 needs to be regenerated or renewed. Even when it is known that the range changes in the future, the calibration curve 901 that covers the new range cannot be generated without the spectrum in the actual process.

Therefore, the following points can be problematic in the comparative example.

1. The near-infrared measuring instrument 902 needs to be installed in the actual process to collect data.
2. The data collection requires about six months.
3. Only the calibration curve 901 in a limited range can be generated.
4. A device for analyzing the property value corresponding to the spectrum data 907, such as the gas chromatograph 905, is necessary.

One of the disclosed embodiments will be described below, with reference to the drawings. The problems stated above can be solved according to this embodiment.

In the drawings, the same or corresponding parts are given the same reference signs. In the description of this embodiment, the description of the same or corresponding parts is omitted or simplified as appropriate.

Figure 2:
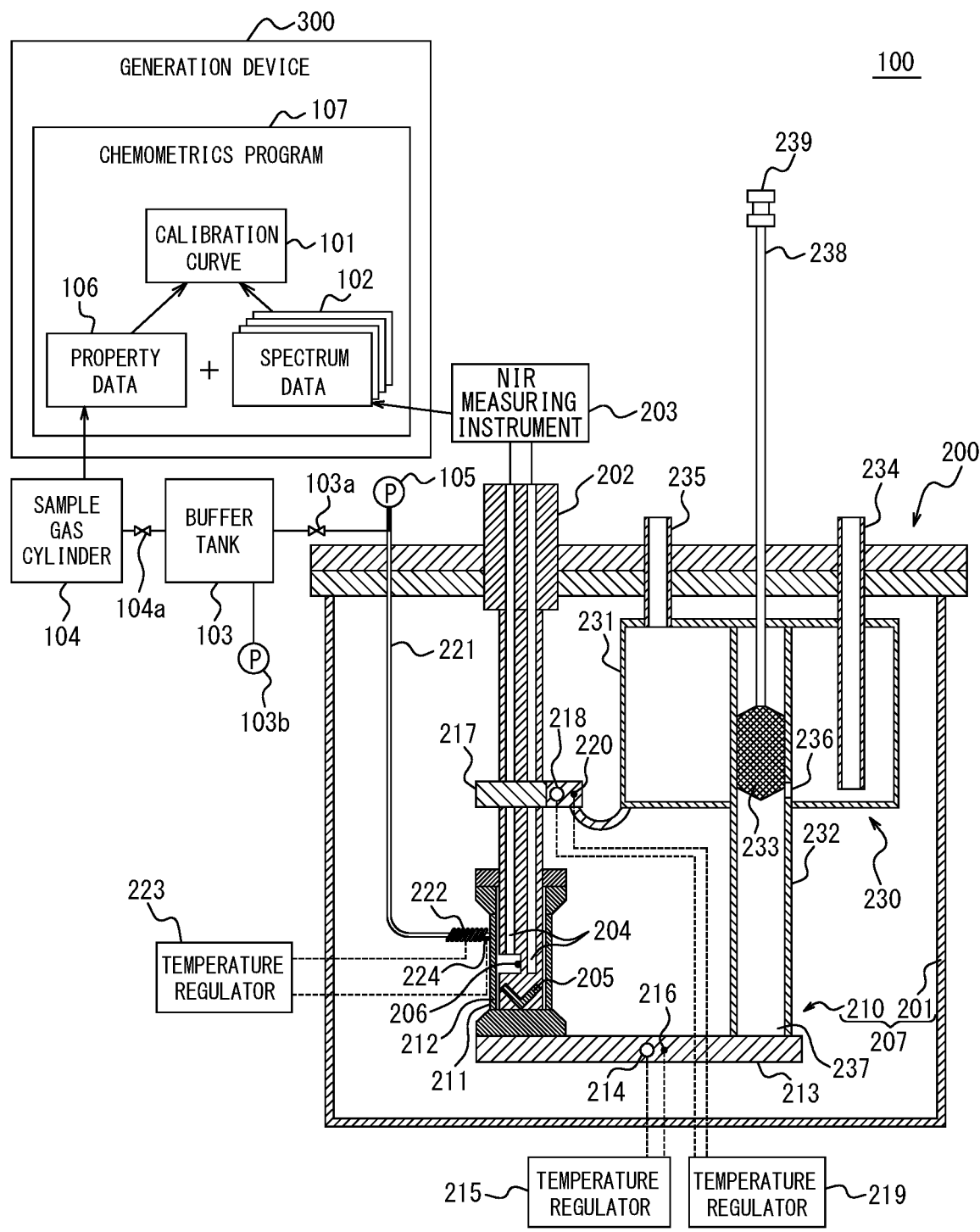
FIG. 2 is a diagram illustrating the structure of the calibration curve generation system according to the embodiment.

An overview of a calibration curve generation system 100 according to this embodiment will be described below, with reference to FIGS. 1 and 2.

The calibration curve generation system 100 performs the following steps:
1. Sample gas is injected into a container 201.
2. The sample gas in the container 201 is liquefied.
3. The absorbance spectrum of the sample gas in a liquefied state is measured by a near-infrared (NIR) measuring instrument 203 via a near-infrared (NIR) probe 202 extending from inside to outside the container 201.

By using, as the sample gas, a plurality of samples that differ in property value, the measurement result of the absorbance spectrum of the sample gas is obtained for each property value as a result of these steps.

The calibration curve generation system 100 further performs the following step:
4. From the measurement result of the absorbance spectrum of the sample gas obtained for each property value, a calibration curve 101 representing the relationship between the property value and the absorbance spectrum of the sample gas is generated.

In this embodiment, the sample gas is not natural LNG, but gas resembling LNG. Specifically, the sample gas is gas produced so as to cover an assumed concentration range of each component of LNG. The sample gas may be gas resembling any other type of liquefied gas such as LPG or vinyl chloride. The "LPG" stands for liquefied petroleum gas.

In this embodiment, the calibration curve generation system 100 liquefies the sample gas resembling LNG, measures the absorbance spectrum, and generates a universal calibration curve for LNG direct measurement covering assumed variable factors of LNG. That is, the calibration curve generation system 100 generates the calibration curve 101 that covers the composition distribution of LNG. As a result of generating such a calibration curve 101, the property value of LNG can be continuously analyzed without performing calibration curve generation on site.

For the generation of the calibration curve 101, the number of pieces of spectrum data 102 needs to be sufficient to cover a range in which each factor that varies the absorbance spectrum, such as the concentration of each measured component and the temperature, can vary, as mentioned earlier. Accordingly, the calibration curve generation system 100 liquefies the sample gas of any concentration, measures the absorbance of the liquefied sample gas for near-infrared light, and acquires spectrum data 102.

The structure of the calibration curve generation system 100 will be described below.

The calibration curve generation system 100 includes a measurement device 200 and a generation device 300.

The measurement device 200 includes the container 201, a liquefaction mechanism 210, the near-infrared probe 202, and the near-infrared measuring instrument 203.

The sample gas is injected into the container 201. The liquefaction mechanism 210 is a mechanism that liquefies the sample gas in the container 201. The near-infrared probe 202 is installed to extend from inside to outside the container 201. The near-infrared measuring instrument 203 is a device that measures the absorbance spectrum of the sample gas in a state of being liquefied by the liquefaction mechanism 210, via the near-infrared probe 202.

The liquefaction mechanism 210 includes a cylindrical body 211 and a cooling instrument 230.

The cylindrical body 211 is a part that forms a liquefaction chamber 212 in the container 201. The cylindrical body 211 may have any shape such as a cylinder or a square tube, as long as it is hollow. In this embodiment, the cylindrical body 211 is made of copper. The liquefaction chamber 212 is a space into which the sample gas is introduced. The cooling instrument 230 is a device that cools the cylindrical body 211 to liquefy the sample gas in the liquefaction chamber 212. Part of the near-infrared probe 202 is located in the liquefaction chamber 212. The near-infrared measuring instrument 203 irradiates the sample gas in the liquefaction chamber 212 in a state of being liquefied by the cooling instrument 230 with near-infrared light via the near-infrared probe 202, and detects at least one of transmitted light or reflected light via the near-infrared probe 202 to measure the absorbance spectrum of the sample gas. In this embodiment, the near-infrared probe 202 is provided with a pair of light guides 204 and a mirror 205. Near-infrared light emitted from the near-infrared measuring instrument 203 reaches the inside of the liquefaction chamber 212 through one light guide 204. Light that has passed through the sample gas in a liquefied state in the liquefaction chamber 212 reflects off the mirror 205, and returns to the near-infrared measuring instrument 203 through the other light guide 204.

The liquefaction mechanism 210 further includes a first heat transfer material 213, a first heater 214, and a first temperature regulator 215. In this embodiment, the liquefaction mechanism 210 further includes a first temperature sensor 216.

The first heat transfer material 213 is a heat transfer material that thermally connects the cooling instrument 230 to the cylindrical body 211. In this embodiment, the first heat transfer material 213 is a heat exchanger plate made of copper. The first heater 214 is a heater that heats the first heat transfer material 213. The first heater 214 is attached to the first heat transfer material 213. The first temperature regulator 215 is a temperature regulator that regulates the temperature of the first heat transfer material 213 by controlling the first heater 214. The first temperature sensor 216 is a sensor that measures the temperature of the first heater 214. The first temperature sensor 216 is attached to a part of the first heat transfer material 213 adjacent to the first heater 214. The first temperature sensor 216 may measure the temperature of the first heat transfer material 213.

The cooling instrument 230 includes a coolant tank 231 and a cooling pipe 232. In this embodiment, the cooling instrument 230 further includes a temperature regulation part 233.

The coolant tank 231 is made of steel in this embodiment. Specifically, the coolant tank 231 is made of stainless steel. A coolant is injected into the coolant tank 231. The coolant may be any refrigerant. In this embodiment, the coolant is liquid nitrogen. The coolant tank 231 is located in the container 201. The coolant tank 231 is provided with an inlet tube 234 and an outlet tube 235. The inlet tube 234 and the outlet tube 235 both pass through the ceiling of the coolant tank 231 and the canopy of the container 201. One end of each of the inlet tube 234 and the outlet tube 235 is open so as to communicate with the internal space of the coolant tank 231. The other end of each of the inlet tube 234 and the outlet tube 235 is open so as to communicate with the external space of the container 201. Liquid nitrogen is injected into the coolant tank 231 from outside the container 201 through the inlet tube 234. Liquid nitrogen that has evaporated in the coolant tank 231 is discharged to outside the container 201 through the outlet tube 235. The first heat transfer material 213 is located below and away from the coolant tank 231. The cooling pipe 232 is a pipe that conveys the coolant which is liquid nitrogen from the coolant tank 231 to the first heat transfer material 213. The cooling pipe 232 extends from the ceiling of the coolant tank 231 to the bottom of the coolant tank 231, and passes through the bottom of the coolant tank 231 and further extends downward to come into contact with the first heat transfer material 213. The cooling pipe 232 is made of steel and specifically made of stainless steel in this embodiment, as with the coolant tank 231. The cooling pipe 232 has a hole 236 through which the internal space of the coolant tank 231 and the internal space of the cooling pipe 232 communicate with each other, at a position slightly higher than the bottom of the coolant tank 231. A cooler 237 is formed in the cooling pipe 232 at one end closer to the first heat transfer material 213. The temperature regulation part 233 is placed in the cooling pipe 232 so as to be displaceable along the extending direction of the cooling pipe 232. In this embodiment, the temperature regulation part 233 is made of a porous material, and allows liquid nitrogen to permeate and exude slowly. A knob 239 for adjusting the position of the temperature regulation part 233 is attached to the temperature regulation part 233 via a long material 238.

The liquefaction mechanism 210 further includes a second heat transfer material 217, a second heater 218, and a second temperature regulator 219. In this embodiment, the liquefaction mechanism 210 further includes a second temperature sensor 220.

The second heat transfer material 217 is a heat transfer material that thermally connects the cooling instrument 230 to the near-infrared probe 202. In this embodiment, the second heat transfer material 217 is a thermal anchor made of copper. The second heater 218 is a heater that heats the second heat transfer material 217. The second heater 218 is attached to the second heat transfer material 217. The second temperature regulator 219 is a temperature regulator that regulates the temperature of the second heat transfer material 217 by controlling the second heater 218. The second temperature sensor 220 is a sensor that measures the temperature of the second heater 218. The second temperature sensor 220 is attached to a part of the second heat transfer material 217 adjacent to the second heater 218. The second temperature sensor 220 may measure the temperature of the second heat transfer material 217.

The second heat transfer material 217 thermally connects the outer shell of the coolant tank 231 to the near-infrared probe 202.

The liquefaction mechanism 210 further includes an introduction tube 221. In this embodiment, the liquefaction mechanism 210 further includes a third heater 222, a third temperature regulator 223, and a third temperature sensor 224.

The introduction tube 221 is piping that introduces the sample gas into the liquefaction chamber 212. In this embodiment, the inner diameter of the introduction tube 221 is 1 mm or less, and specifically 1 mm. The third heater 222 is a heater that heats the introduction tube 221. The third heater 222 is attached to a part of the introduction tube 221 close to an introduction port into the liquefaction chamber 212. The third temperature regulator 223 is a temperature regulator that regulates the temperature of the introduction tube 221 by controlling the third heater 222. The third temperature sensor 224 is a sensor that measures the temperature of the third heater 222. The third temperature sensor 224 is attached to a part of the introduction tube 221 adjacent to the third heater 222. The third temperature sensor 224 may measure the temperature of the introduction tube 221.

The introduction tube 221 is connected to a buffer tank 103 via an on-off valve 103a. The buffer tank 103 is connected to a sample gas cylinder 104 via an on-off valve 104a. Sample gas prepared according to any composition is enclosed in the sample gas cylinder 104. The introduction tube 221 is also connected to a vacuum pump (not illustrated). The vacuum pump is capable of creating a high vacuum in the introduction tube 221, and capable of creating a high vacuum in the buffer tank 103. The introduction tube 221 is further connected to a pressure gauge 105. The buffer tank 103 is connected to a pressure gauge 103b. The pressure gauge 105 and the pressure gauge 103b can respectively measure the pressure in the introduction tube 221 and the pressure in the buffer tank 103 in a state in which the on-off valve 103a and the on-off valve 104a are closed. The calibration curve generation system 100 can maintain the pressure in the introduction tube 221 at any pressure based on the measurement result of the pressure gauge 105, and maintain the pressure in the buffer tank 103 at any pressure based on the measurement result of the pressure gauge 103b.

The measurement device 200 further includes a temperature sensor 206.

The temperature sensor 206 is located in the liquefaction chamber 212. The temperature sensor 206 is a sensor that measures the temperature in the liquefaction chamber 212, i.e. the temperature of the sample gas injected in the liquefaction chamber 212 and the liquefied sample gas.

In the measurement device 200, the container 201 and the liquefaction mechanism 210 constitute a cryostat 207. The cryostat 207 is a device that cools the sample using liquid nitrogen. The cryostat 207 is produced to be capable of controlling the liquefaction chamber 212 in a range of −190° C. to 30° C.

The operation of the measurement device 200 will be described below.

The measurement device 200 performs the following steps as steps of a spectrum measurement method and a calibration curve generation method according to this embodiment:

1. A high vacuum is maintained in the cryostat 207, and the cryostat 207 is thermally insulated from outside air.
2. The coolant tank 231 is filled with liquid nitrogen. The liquid nitrogen passes through the cooling pipe 232 to reach the cooler 237, and takes heat from the first heat transfer material 213.
3. The position of the temperature regulation part 233 is adjusted using the knob 239, to control the amount of liquid nitrogen reaching the cooler 237 and the speed at which the liquid nitrogen reaches the cooler 237. In the case where the temperature regulation part 233 is located between the hole 236 of the cooling pipe 232 and the first heat transfer material 213 as illustrated in FIG. 1, liquid nitrogen permeates into and exudes from the temperature regulation part 233 and then slowly reaches the cooler 237, and the first heat transfer material 213 is gradually cooled. In the case where no part is located between the hole 236 of the cooling pipe 232 and the first heat transfer material 213 as illustrated in FIG. 2, on the other hand, liquid nitrogen reaches the cooler 237 at once, and the first heat transfer material 213 is rapidly cooled. In the case where at least part of the hole 236 of the cooling pipe 232 is not blocked by the temperature regulation part 233 (i.e. the hole 236 of the cooling pipe 232 is fully open), the amount of liquid nitrogen reaching the cooler 237 increases, and the degree of cooling of the first heat transfer material 213 increases. In the case where at least part of the hole 236 of the cooling pipe 232 is blocked by the temperature regulation part 233, the amount of liquid nitrogen reaching the cooler 237 decreases, and the degree of cooling of the first heat transfer material 213 decreases.

4. The first heater 214 of the first heat transfer material 213 is controlled by the first temperature regulator 215 to regulate the temperature of the first heat transfer material 213. The first temperature regulator 215 performs PID control depending on the temperature measurement value obtained by the first temperature sensor 216. The "PID" stands for proportional integral differential. In this embodiment, the temperature of the first heat transfer material 213 can be adjusted to any temperature by controlling the amount of liquid nitrogen reaching the cooler 237 and the amount of heating by the first heater 214.

5. The second heater 218 of the second heat transfer material 217 is controlled by the second temperature regulator 219 to regulate the temperature of the second heat transfer material 217. The second temperature regulator 219 performs PID control depending on the temperature measurement value obtained by the second temperature sensor 220. In this embodiment, since the near-infrared probe 202 performs heat conduction with outside air, heat transfer from the coolant tank 231 (cooling) can be achieved by connecting the second heat transfer material 217 to the near-infrared probe 202. The temperature of the second heat transfer material 217 can be adjusted to any temperature by controlling the amount of heat transfer from the coolant tank 231 and the amount of heating by the second heater 218.

6. The temperature of the liquefaction chamber 212 is adjusted to a temperature at which the sample gas can be liquefied, by the temperature control of the first heat transfer material 213 and the second heat transfer material 217. The temperature of the liquefaction chamber 212 is measured by the temperature sensor 206 placed in a cut-out part of the near-infrared probe 202, and feedback of the measured temperature is provided.

The measurement device 200 further performs the following steps as steps of the spectrum measurement method and the calibration curve generation method according to this embodiment:

7. To maintain the purity of the sample gas, the liquefaction chamber 212, each piping such as the introduction tube 221, and the buffer tank 103 are vacuumed in a state in which the on-off valve 103*a* is open. After this, in a state in which the on-off valve 103*a* is closed, the sample gas is injected into the buffer tank 103 from the sample gas cylinder 104, and the buffer tank 103 is filled at any pressure. This pressure is measured by the pressure gauge 103*b*.

8. The sample gas is injected into the container 201 from the buffer tank 103. Specifically, the sample gas is supplied from the introduction tube 221 into the liquefaction chamber 212. The inner wall of the cylindrical body 211 takes heat from the introduced sample gas in the liquefaction chamber 212, as a result of which the sample gas forms a liquid. When the sample gas is liquefied, its volume decreases, and the inside of the liquefaction chamber 212 is reduced in pressure. Since the pressure of the buffer tank 103 becomes higher than the pressure of the liquefaction chamber 212, the sample gas is continuously introduced into the liquefaction chamber 212. In addition to the pressure of the buffer tank 103 being higher than the pressure of the liquefaction chamber 212, the introduction tube 221 is very narrow, e.g. 1 mm in inner diameter, so that the sample gas can be liquefied while maintaining the composition of the sample gas without backflow of the sample gas. The cut-out part of the near-infrared probe 202 is filled with the sample gas liquefied in the liquefaction chamber 212.

9. Using the near-infrared measuring instrument 203, near-infrared light is applied through the light guide 204 in the near-infrared probe 202, and transmitted light is detected to measure the spectrum of the liquefied sample gas. During this time, the on-off valve 103*a* may be closed.

10. The temperature of the sample gas is directly measured using the temperature sensor 206. The temperature sensor 206 in the liquefaction chamber 212 is located so as to be in direct contact with the liquefied sample gas.

In the case where the sample gas contains butane, given that butane has a low melting point of −130° C., the temperature of the introduction tube 221 may be regulated by controlling the third heater 222 of the introduction tube 221 by the third temperature regulator 223 to prevent freezing of the introduction tube 221. In such a case, the third temperature regulator 223 performs PID control depending on the temperature measurement value obtained by the third temperature sensor 224.

The generation device 300 stores property data 106 indicating the property value of the sample gas beforehand. The property data 106 indicates the composition of the sample gas enclosed in the sample gas cylinder 104, which is known when preparing the sample gas. The generation device 300 is installed with a chemometrics program 107.

The operation of the generation device 300 will be described below.

The generation device 300 performs the following step as a step of the calibration curve generation method according to this embodiment:

11. The calibration curve 101 is generated using the chemometrics program 107, from the property value of the sample gas indicated by the property data 106, the spectrum measured using the near-infrared measuring instrument 203, and the temperature data in the spectrum measurement measured using the temperature sensor 206.

Figure 3:
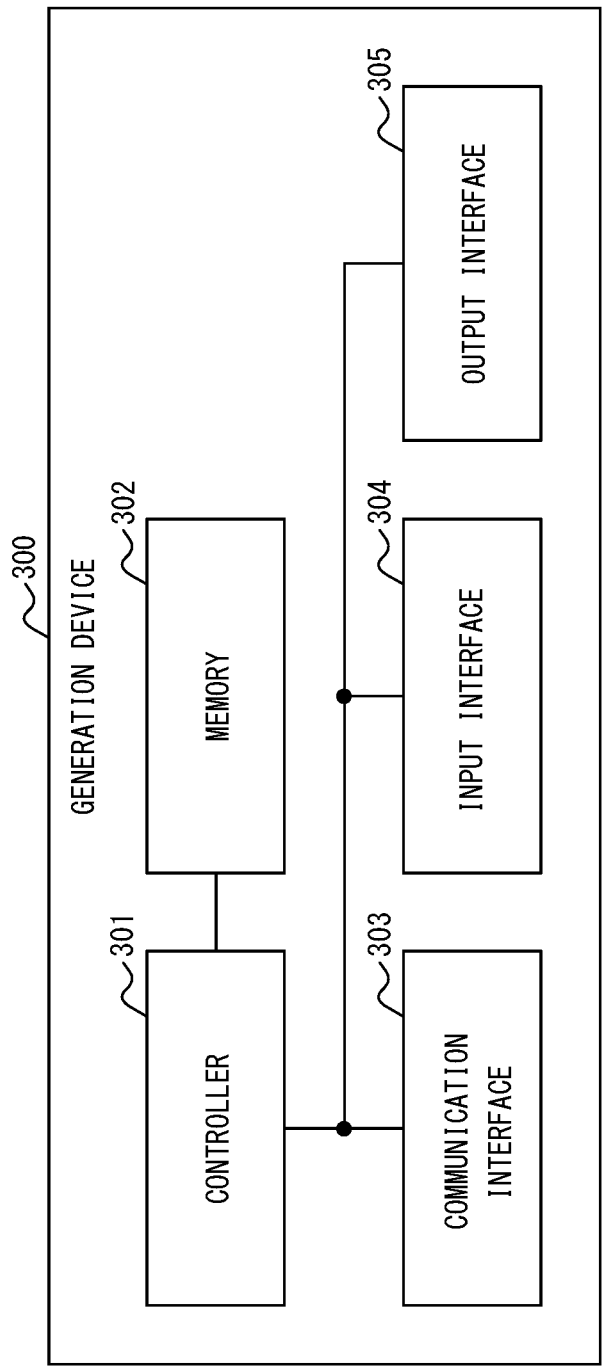
FIG. 3 is a block diagram illustrating a structure of a generation device according to the embodiment.

The detailed structure of the generation device 300 will be described below, with reference to FIG. 3.

The generation device 300 includes a controller 301, a memory 302, a communication interface 303, an input interface 304, and an output interface 305.

The controller 301 is one or more processors. Examples of processors that can be used include general-purpose processors such as CPU and dedicated processors specialized in specific processing. The "CPU" stands for central processing unit. The controller 301 may include one or more dedicated circuits, or one or more processors may be replaced with one or more dedicated circuits in the controller 301. Examples of dedicated circuits that can be used include FPGA and ASIC. The "FPGA" stands for field-programmable gate array. The "ASIC" stands for application specific integrated circuit. The controller 301 executes information processing relating to the operation of the generation device 300 while controlling each component in the generation device 300.

The memory 302 is one or more memories. Examples of memories that can be used include semiconductor memory, magnetic memory, and optical memory. The memory may function as a main storage device, an auxiliary storage device, or cache memory. The memory 302 stores information used for the operation of the generation device 300 and information obtained as a result of the operation of the generation device 300.

The communication interface 303 is one or more communication modules. Examples of communication modules that can be used include communication modules conforming to LAN standards. The "LAN" stands for local area network. The communication interface 303 receives information used for the operation of the generation device 300, and transmits information obtained as a result of the operation of the generation device 300.

The input interface 304 is one or more input interfaces. Examples of input interfaces that can be used include physical keys, capacitive keys, pointing devices, and touch screens provided integrally with displays. The input interface 304 receives input of information used for the operation of the generation device 300, from a user.

The output interface 305 is one or more output interfaces. Examples of output interfaces that can be used include displays. Examples of displays that can be used include LCDs and organic EL displays. The "LCD" stands for liquid crystal display. The "EL" stands for electro luminescence. The output interface 305 outputs information obtained as a result of the operation of the generation device 300, to the user.

The functions of the generation device 300 are implemented by the processor included in the controller 301 executing a calibration curve generation program according to this embodiment including the chemometrics program 107. That is, the functions of the generation device 300 are implemented by software. The calibration curve generation program is a program for causing a computer to execute the processes of the steps included in the operation of the generation device 300 to achieve the functions corresponding to the processes of the steps. In other words, the calibration curve generation program is a program for causing the computer to function as the generation device 300.

The program can be recorded in a computer-readable recording medium. Examples of computer-readable recording media that can be used include magnetic recording devices, optical discs, magnetooptical recording media, and semiconductor memory. The program is distributed, for example, by selling, giving, or renting a portable recording medium such as DVD or CD-ROM in which the program is recorded. The "DVD" stands for digital versatile disc. The "CD-ROM" stands for compact disc read only memory. The program may be distributed by storing the program in a storage of a server and transferring the program from the server to another computer via a network. The program may be provided as a program product.

For example, the computer stores the program recorded in the portable recording medium or the program transferred from the server, in memory. The computer then reads the program stored in the memory by a processor, and executes processes according to the read program by the processor. The computer may directly read the program from the portable recording medium and execute processes according to the program. The computer may, each time the program is transferred from the server to the computer, execute processes according to the received program. Processes may be executed by an ASP-type service that achieves functions only by execution instruction and result acquisition, without transferring the program from the server to the computer. The "ASP" stands for application service provider. The program includes information that is to be processed by an electronic computer equivalent to a computer program. For example, data that is not a direct command to a computer but has property of defining a computer process is "equivalent to a computer program".

All or part of the functions of the generation device 300 may be implemented by the dedicated circuit included in the controller 301. That is, all or part of the functions of the generation device 300 may be implemented by hardware.

Figure 4:
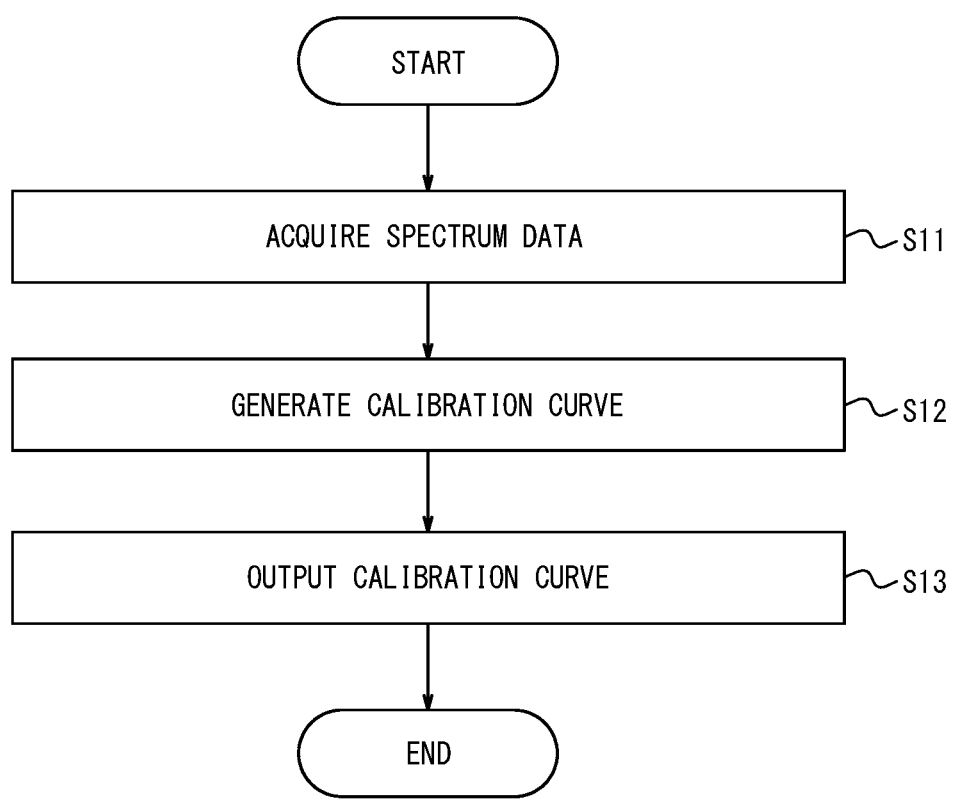
FIG. 4 is a flowchart illustrating operation of the generation device according to the embodiment.

The detailed operation of the generation device 300 will be described below, with reference to FIG. 4. The flowchart in FIG. 4 illustrates the procedure of the calibration curve generation program according to this embodiment.

In step S11, the controller 301 acquires, via the communication interface 303 or the input interface 304, the spectrum data 102 indicating the measurement result of the absorbance spectrum of the sample gas obtained by the measurement device 200 for each property value as a result of using, as the sample gas, a plurality of samples that differ in property value. The controller 301 stores the acquired spectrum data 102 in the memory 302. The property data 106 indicating the property value of each sample is stored in the memory 302 beforehand.

In this embodiment, the spectrum data 102 is data indicating the measurement result of the absorbance spectrum of the sample gas obtained by the measurement device 200 for each combination of property value and temperature as a result of using, as the sample gas, a plurality of samples that differ in property value and changing the temperature of the sample gas in the liquefaction chamber 212.

In step S12, the controller 301 generates the calibration curve 101 representing the relationship between the property value and the absorbance spectrum of the sample gas, from the measurement result of the absorbance spectrum of the sample gas indicated by the spectrum data 102 stored in the memory 302 in step S11. Specifically, the calibration curve 101 is data indicating a formula that includes a parameter for inputting the absorbance spectrum of LNG and outputs the concentration of each component of the LNG or the calorific value or density of the LNG corresponding to the input value of the absorbance spectrum.

Specifically, the controller 301 reads the spectrum data 102 and the property data 106 from the memory 302. The controller 301 executes the chemometrics program 107 to analyze the correlation between the measurement value of the absorbance spectrum of each sample indicated by the spectrum data 102 and the concentration of each component of each sample or the calorific value or density of each sample indicated by the property data 106, thus generating the calibration curve 101.

In this embodiment, the controller 301 generates, from the measurement result of the absorbance spectrum of the sample gas indicated by the spectrum data 102, the calibration curve 101 representing the relationship among the property value, the temperature, and the absorbance spectrum of the sample gas. Specifically, the calibration curve 101 is data indicating a formula that includes a parameter for inputting the temperature of LNG and a parameter for inputting the absorbance spectrum of the LNG and outputs the concentration of each component of the LNG or the calorific value or density of the LNG corresponding to the input values of the temperature and absorbance spectrum.

In step S13, the controller 301 outputs the calibration curve 101 generated in step S12, via the communication interface 303 or the output interface 305.

Figure 5:
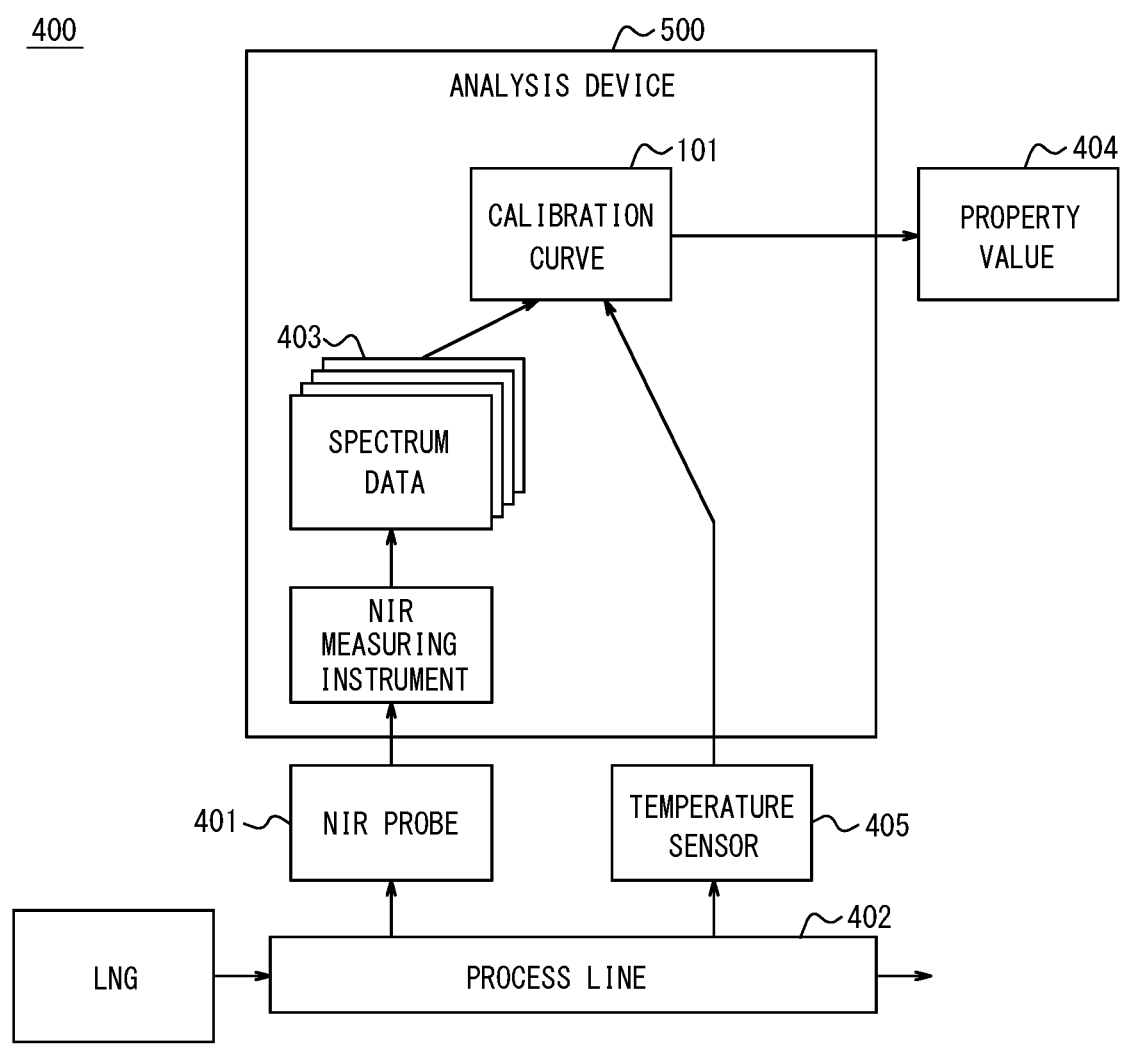
FIG. 5 is a diagram illustrating a structure of a property analysis system according to the embodiment.

An overview of a property analysis system 400 according to this embodiment will be described below, with reference to FIG. 5.

The property analysis system 400 performs the following steps as steps of a property analysis method according to this embodiment:

1. An absorbance spectrum of liquefied gas is measured using near-infrared spectroscopy.
2. A property value of the liquefied gas is calculated from the calibration curve 101 representing the relationship between the property value and the absorbance spectrum of the sample gas and the measurement result of the absorbance spectrum of the liquefied gas. Here, the calibration curve 101 has been generated by the calibration curve generation system 100 from the measurement result of the absorbance spectrum of the sample gas obtained for each property value as a result of using a plurality of samples that differ in property value as the sample gas.

In this embodiment, the liquefied gas is LNG. In the case where the sample gas used in the calibration curve generation system 100 is gas resembling LPG, the liquefied gas is LPG. In the case where the sample gas used in the calibration curve generation system 100 is gas resembling vinyl chloride, the liquefied gas is vinyl chloride.

The structure of the property analysis system 400 will be described below.

The property analysis system 400 includes a near-infrared (NIR) probe 401 and an analysis device 500 including a near-infrared (NIR) measuring instrument.

The near-infrared probe 401 is inserted in piping of a process line 402 in an LNG production plant. The analysis device 500 is a near-infrared spectrometer to which the calibration curve 101 is applied. The analysis device 500 is connected to the near-infrared probe 401. The analysis device 500 measures the absorbance spectrum of the LNG flowing in the process line 402, to obtain spectrum data 403. The analysis device 500 applies the obtained spectrum data 403 to the calibration curve 101 generated by the calibration curve generation system 100 beforehand, to determine a property value 404 of the LNG.

The property analysis system 400 further includes a temperature sensor 405.

The temperature sensor 405 is located in the piping of the process line 402. The temperature sensor 405 is a sensor that measures the temperature of the LNG flowing in the process line 402.

Figure 6:
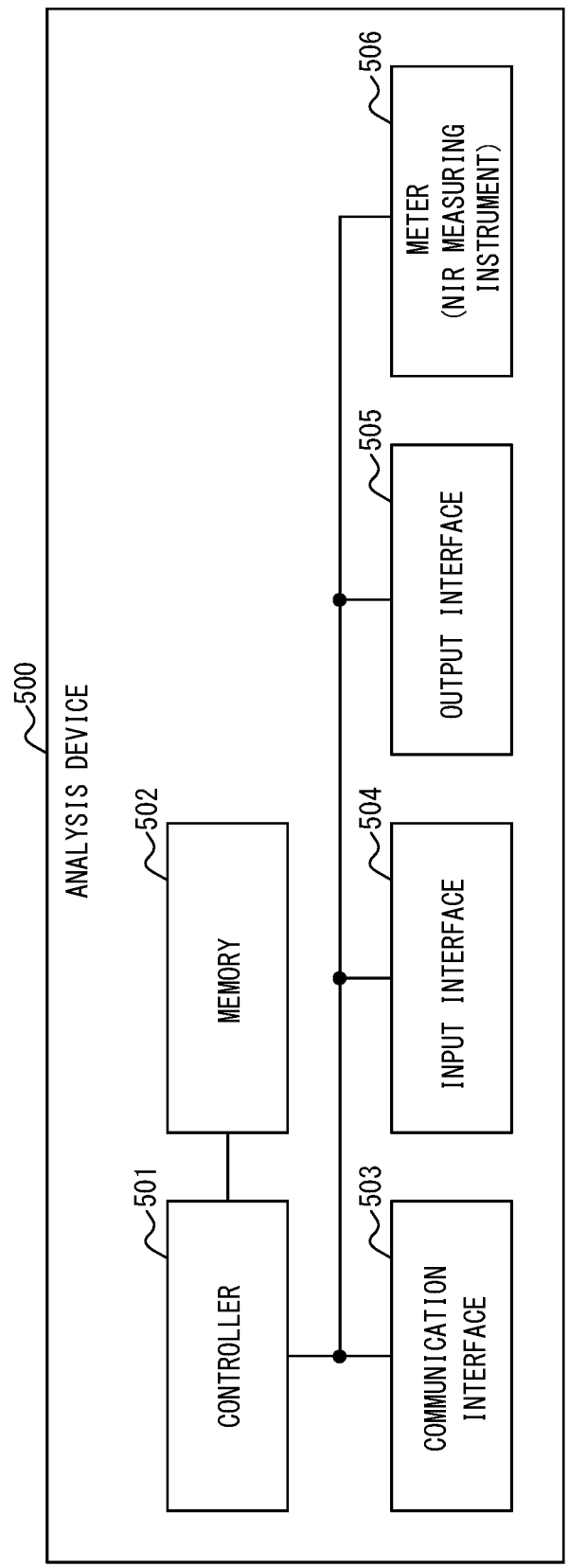
FIG. 6 is a block diagram illustrating a structure of an analysis device according to the embodiment.

The detailed structure of the analysis device 500 will be described below, with reference to FIG. 6.

The analysis device 500 includes a controller 501, a memory 502, a communication interface 503, an input interface 504, an output interface 505, and a meter 506.

The controller 501 is one or more processors. Examples of processors that can be used include general-purpose processors such as CPU and dedicated processors specialized in specific processing. The controller 501 may include one or more dedicated circuits, or one or more processors may be replaced with one or more dedicated circuits in the controller 501. Examples of dedicated circuits that can be used include FPGA and ASIC. The controller 501 executes information processing relating to the operation of the analysis device 500 while controlling each component in the analysis device 500.

The memory 502 is one or more memories. Examples of memories that can be used include semiconductor memory, magnetic memory, and optical memory. The memory may function as a main storage device, an auxiliary storage device, or cache memory. The memory 502 stores information used for the operation of the analysis device 500 and information obtained as a result of the operation of the analysis device 500.

The communication interface 503 is one or more communication modules. Examples of communication modules that can be used include communication modules conforming to LAN standards. The communication interface 503 receives information used for the operation of the analysis device 500, and transmits information obtained as a result of the operation of the analysis device 500.

The input interface 504 is one or more input interfaces. Examples of input interfaces that can be used include physical keys, capacitive keys, pointing devices, and touch screens provided integrally with displays. The input interface 504 receives input of information used for the operation of the analysis device 500, from a user.

The output interface 505 is one or more output interfaces. Examples of output interfaces that can be used include displays. Examples of displays that can be used include LCDs and organic EL displays. The output interface 505 outputs information obtained as a result of the operation of the analysis device 500, to the user.

The meter 506 is a near-infrared (NIR) measuring instrument. The meter 506 measures the absorbance spectrum of the liquefied gas using near-infrared spectroscopy.

The functions of the analysis device 500 are implemented by the processor included in the controller 501 executing a property analysis program according to this embodiment. That is, the functions of the analysis device 500 are implemented by software. The property analysis program is a program for causing a computer to execute the processes of the steps included in the operation of the analysis device 500 to achieve the functions corresponding to the processes of the steps. In other words, the property analysis program is a program for causing the computer to function as the analysis device 500.

All or part of the functions of the analysis device 500 may be implemented by the dedicated circuit included in the controller 501. That is, all or part of the functions of the analysis device 500 may be implemented by hardware.

Figure 7:
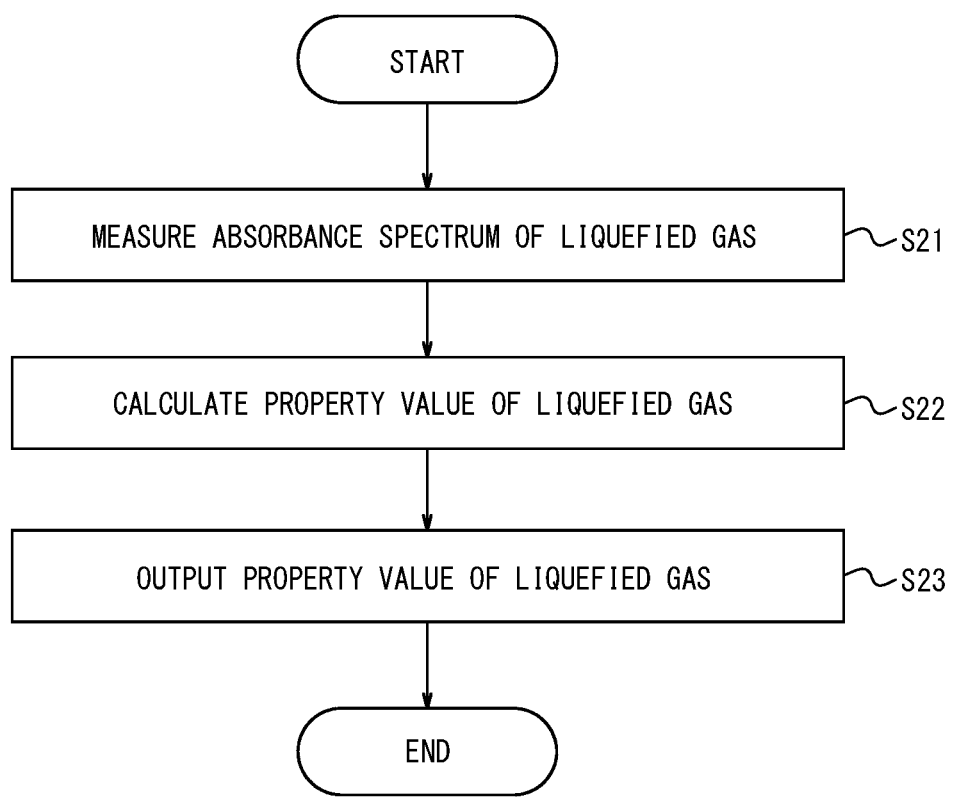
FIG. 7 is a flowchart illustrating operation of the analysis device according to the embodiment.

The detailed operation of the analysis device 500 according to this embodiment will be described below, with reference to FIG. 7. The flowchart in FIG. 7 illustrates the procedure of the property analysis program according to this embodiment.

In step S21, the meter 506 measures the absorbance spectrum of the LNG using near-infrared spectroscopy. The meter 506 stores the measurement result of the absorbance spectrum of the LNG in the memory 502 as the spectrum data 403. The calibration curve 101 representing the relationship between the property value and the absorbance spectrum of the sample gas resembling LNG and output from the calibration curve generation system 100 is stored in the memory 502 beforehand.

In this embodiment, the calibration curve 101 representing the relationship among the property value, the temperature, and the absorbance spectrum of the sample gas resembling LNG and output from the calibration curve generation system 100 is stored in the memory 502 beforehand.

In step S22, the controller 501 calculates the property value 404 of the LNG, from the calibration curve 101 stored in the memory 502 and the measurement result of the absorbance spectrum of the LNG obtained by the meter 506 in step S21.

Specifically, the controller 501 reads the spectrum data 403 and calibration curve 101 from the memory 502. The controller 501 inputs the measurement value of the absorbance spectrum of the LNG flowing in the process line 402, which is indicated by the spectrum data 403, to the calibration curve 101, and acquires the property value 404, such as the concentration of each component of the LNG or the calorific value or density of the LNG, output from the calibration curve 101.

In this embodiment, the measurement result of the temperature of the LNG obtained by the temperature sensor 405 is input to the input interface 504. The controller 501 calculates the property value 404 of the LNG from the calibration curve 101 stored in the memory 502, the measurement result of the temperature of the LNG input to the input interface 504, and the measurement result of the absorbance spectrum of the LNG obtained by the meter 506.

In step S23, the controller 501 outputs the property value 404 of the LNG calculated in step S22, via the communication interface 503 or the output interface 505.

As described above, in this embodiment, the measurement device 200 including the near-infrared measuring instrument 203 and the generation device 300 are used to generate the calibration curve 101 for converting the absorbance spectrum of the measurement object into the property value such as the concentration of each component contained in the measurement object or the calorific value or density of the measurement object. To generate the calibration curve 101, the gas is cooled to form a liquid. After the generation of the calibration curve 101, the analysis device 500 including the near-infrared measuring instrument is used to measure the absorbance spectrum of the LNG, and calculate the property value 404 such as the concentration of each component of the LNG or the calorific value or density of the LNG.

Although LNG is subjected to calibration curve generation and property analysis in this embodiment, any sample that can be cooled in the liquefaction chamber 212 may be subjected to calibration curve generation and property analysis. For example, a calibration curve covering the composition of LPG whose boiling point at atmospheric pressure is about −40° C. may be generated. A calibration curve covering the composition of vinyl chloride whose boiling point at atmospheric pressure is about −13° C. and that is known as a raw material of Saran Wrap® (Saran Wrap is a registered trademark in Japan, other countries, or both) may be generated. The analysis device 500 is usable for property analysis not only in an LNG production plant but also in any liquefied gas production plant such as an LPG production plant or a vinyl chloride production plant.

The analysis device 500 may be installed and used not only in a liquefied gas production plant but also in any location in which liquefied gas such as LNG is produced, transported, stored, or used.

Advantageous effects according to this embodiment will be described below.

With the measurement device 200 according to this embodiment, the spectrum data 102 for generating the calibration curve 101 can be collected without installing the near-infrared measuring instrument 203 in an actual process. By using, as the sample gas, a plurality of samples each adjusted so that the property value covers a desired range, a sufficient amount of spectrum data 102 can be collected in a short time. Moreover, the range of the property value can be freely widened. From the collected spectrum data 102, the calibration curve 101 representing the relationship between the property value and the absorbance spectrum of liquefied gas can be generated. Thus, by use of the analysis device 500 including the near-infrared measuring instrument, the property of the liquefied gas can be analyzed without vaporizing the liquefied gas. This improves the efficiency of liquefied gas property analysis.

According to this embodiment, the sample gas is liquefied in the liquefaction chamber 212, and the sample gas in a liquefied state is irradiated with near-infrared light for measurement in the same liquefaction chamber 212. In this way, the absorbance spectrum of the sample gas in a liquefied state can be measured with high accuracy.

According to this embodiment, both cooling and heating are possible because a coolant and a heater are used in the liquefaction mechanism 210, so that the temperature in the liquefaction chamber 212 can be freely regulated.

According to this embodiment, the temperature in the liquefaction chamber 212 can be decreased with a simple structure.

According to this embodiment, the introduction tube 221 is narrow, which prevents backflow of the sample gas.

According to this embodiment, the temperature sensor 206 is installed in the liquefaction chamber 212, so that the temperature of the sample gas in a liquefied state can be measured with high accuracy.

According to this embodiment, the sample gas is injected into the container 201 from the buffer tank 103 that is filled with the sample gas after vacuuming, so that the purity of the sample gas can be maintained.

With the calibration curve generation system 100 according to this embodiment, by using, as the sample gas, a plurality of samples each adjusted so that the property value covers a desired range, a highly versatile calibration curve 101, namely, a universal calibration curve, can be generated in a short time. Moreover, the range of the property value can be freely widened. When analyzing the property of liquefied gas using the analysis device 500 including the near-infrared measuring instrument, the property value 404 of the liquefied gas can be obtained by applying the measurement result of the absorbance spectrum of the liquefied gas obtained by the near-infrared measuring instrument to the generated calibration curve 101. This improves the efficiency of liquefied gas property analysis.

Figure 8:
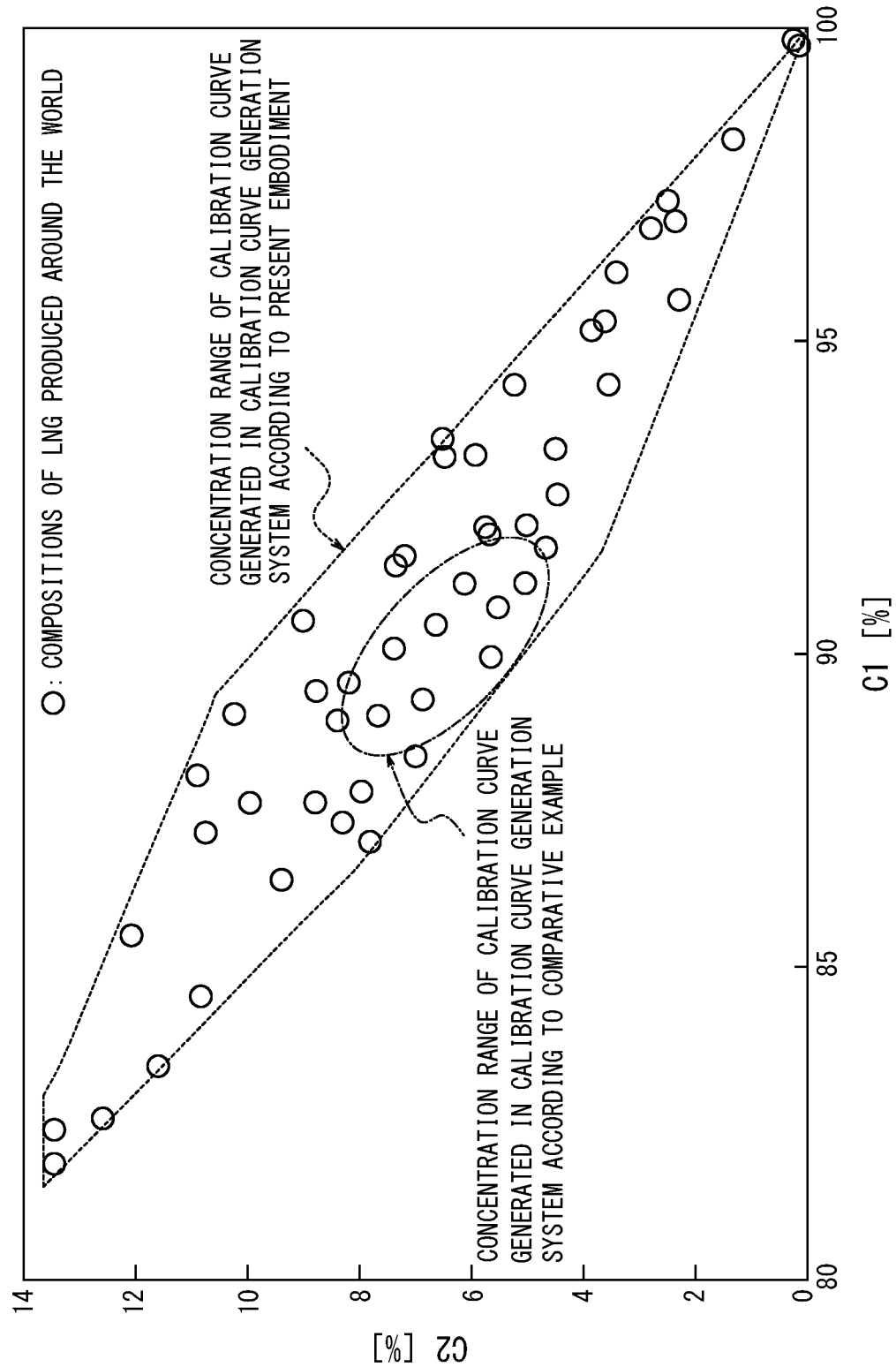
FIG. 8 is a graph illustrating an example of a range of a property value covered in each of the embodiment and a comparative example.

FIG. 8 illustrates an example of the range of the property value covered by the calibration curve 101 generated in the calibration curve generation system 100 and the range of the property value covered by the calibration curve 901 generated in the comparative example. C1 in the horizontal axis represents the concentration of methane in LNG, and C2 in the vertical axis represents the concentration of ethane in LNG. As is clear from the example in FIG. 8, the concentration range of each component of LNG that can be covered by the calibration curve 901 generated in the comparative example is only a small part of the concentration range that can be taken on by the components of LNG. Meanwhile, the calibration curve 101 generated in the calibration curve generation system 100 can cover nearly the whole concentration range that can be taken on by the components of LNG. Thus, the calibration curve 101 generated in the calibration curve generation system 100 can cover compositions of LNG produced around the world.

According to this embodiment, the calibration curve 101 that also takes the temperature into account is generated, so that an offset in the spectrum measurement result caused by a temperature difference can be corrected.

With the analysis device 500 according to this embodiment, the property of the liquefied gas can be analyzed without vaporizing the liquefied gas. This improves the efficiency of liquefied gas property analysis.

According to this embodiment, the calibration curve 101 that also takes the temperature into account is used in liquefied gas property analysis, so that an offset in the spectrum measurement result caused by a temperature difference can be corrected.

The present disclosure is not limited to the foregoing embodiment. For example, a plurality of blocks in any block diagram may be combined, or one block may be divided into a plurality of blocks. A plurality of steps in any flowchart may be, instead of being executed in chronological order as illustrated, executed in parallel or in different order according to the processing capacity of the device executing each step or according to need. Other changes can be made within the scope of the present disclosure.

The invention claimed is:

1. An analysis device comprising:
a memory configured to store a calibration curve representing a relationship between a property value and an absorbance spectrum of sample gas, the calibration curve being generated from a measurement result of the absorbance spectrum of the sample gas obtained for each property value as a result of injecting the sample gas into a container, liquefying the sample gas in the container, measuring the absorbance spectrum of the sample gas in a liquefied state by a near-infrared measuring instrument via a near-infrared probe extending from inside to outside the container, and using a plurality of samples that differ in property value as the sample gas;
a meter configured to measure an absorbance spectrum of liquefied gas using near-infrared spectroscopy;
a controller configured to calculate a property value of the liquefied gas, from the calibration curve stored in the memory and a measurement result of the absorbance spectrum of the liquefied gas obtained by the meter; and
an input interface configured to receive input of a measurement result of a temperature of the liquefied gas,
wherein the memory is configured to store, as the calibration curve, a calibration curve representing a relationship among the property value, a temperature, and the absorbance spectrum of the sample gas, the calibration curve being generated from a measurement result of the absorbance spectrum of the sample gas obtained for each combination of the property value and the temperature as a result of measuring the temperature of the sample gas in the liquefied state, using the plurality of samples that differ in property value as the sample gas, and changing the temperature of the sample gas in the liquefied state, and
the controller is configured to calculate the property value of the liquefied gas, from the calibration curve stored in the memory, the measurement result of the temperature of the liquefied gas input in the input interface, and the measurement result of the absorbance spectrum of the liquefied gas obtained by the meter.

2. A liquefied gas production plant comprising the analysis device according to claim 1.

3. A property analysis method used by an analysis device, the property analysis method comprising:
measuring an absorbance spectrum of liquefied gas using near-infrared spectroscopy;
calculating a property value of the liquefied gas from a calibration curve representing a relationship between a property value and an absorbance spectrum of sample gas and a measurement result of the absorbance spectrum of the liquefied gas, the calibration curve being generated from a measurement result of the absorbance spectrum of the sample gas obtained for each property value as a result of injecting the sample gas into a container, liquefying the sample gas in the container, measuring the absorbance spectrum of the sample gas in a liquefied state by a near-infrared measuring instrument via a near-infrared probe extending from inside to outside the container, and using a plurality of samples that differ in property value as the sample gas;
measuring a temperature of the liquefied gas; and
calculating the property value of the liquefied gas from, as the calibration curve, a calibration curve representing a relationship among the property value, a temperature, and the absorbance spectrum of the sample gas and the measurement result of the absorbance spectrum of the liquefied gas and a measurement result of the temperature of the liquefied gas, the calibration curve being generated from the measurement result of the absorbance spectrum of the sample gas obtained for each combination of the property value and the temperature as a result of measuring the temperature of the sample gas in the liquefied state, using the plurality of samples that differ in property value as the sample gas, and changing the temperature of the sample gas in the liquefied state.

* * * * *